(12) United States Patent
Kosugiyama

(10) Patent No.: US 7,548,267 B2
(45) Date of Patent: Jun. 16, 2009

(54) DIGITAL SINGLE-LENS REFLEX CAMERA

(75) Inventor: Tsugumoto Kosugiyama, Hino (JP)

(73) Assignee: Olympus Corporation, Tokyo (JP)

( * ) Notice: Subject to any disclaimer, the term of this patent is extended or adjusted under 35 U.S.C. 154(b) by 693 days.

(21) Appl. No.: 11/099,288

(22) Filed: Apr. 5, 2005

(65) Prior Publication Data

US 2005/0237421 A1 Oct. 27, 2005

(30) Foreign Application Priority Data

Apr. 21, 2004 (JP) ............................. 2004-125761

(51) Int. Cl.
*H04N 5/225* (2006.01)
(52) U.S. Cl. ..................... 348/344; 348/360; 348/341; 348/333.01
(58) Field of Classification Search ................. 348/335, 348/360, 333.01, 333.08, 333.09, 344
See application file for complete search history.

(56) References Cited

U.S. PATENT DOCUMENTS

| | | | | |
|---|---|---|---|---|
| 5,150,215 A | * | 9/1992 | Shi | 348/64 |
| 5,848,308 A | * | 12/1998 | Kawamura | 396/374 |
| 6,041,195 A | * | 3/2000 | Honda et al. | 396/429 |
| 6,510,283 B1 | * | 1/2003 | Yamagishi | 396/55 |
| 6,639,626 B1 | * | 10/2003 | Kubo et al. | 348/218.1 |
| 6,710,807 B1 | * | 3/2004 | Yamagishi | 348/362 |
| 6,710,808 B1 | * | 3/2004 | Yamagishi | 348/362 |
| 6,937,281 B1 | * | 8/2005 | Ogawa | 348/333.12 |
| 6,961,089 B2 | * | 11/2005 | Kubo | 348/333.01 |
| 6,965,410 B1 | * | 11/2005 | Yamagishi | 348/362 |
| 7,006,140 B2 | * | 2/2006 | Shono | 348/349 |
| 7,133,608 B1 | * | 11/2006 | Nagata et al. | 396/374 |
| 7,339,620 B1 | * | 3/2008 | Yamagishi et al. | 348/243 |

FOREIGN PATENT DOCUMENTS

| | | |
|---|---|---|
| JP | 06-075266 | 3/1994 |
| JP | 2000-299870 | 10/2000 |
| JP | 2002-199288 | 7/2002 |

OTHER PUBLICATIONS

Chinese Office Action for Chinese Application No. 2005100660093 (4 pgs.), with translation (3 pgs.) mailed Mar. 9, 2007.

* cited by examiner

*Primary Examiner*—Nhan T Tran
*Assistant Examiner*—Amy Hsu
(74) *Attorney, Agent, or Firm*—Straub and Pokotylo; John C. Pokotylo

(57) ABSTRACT

A digital single-lens reflex camera comprises: an optical viewfinder; a retractable movable mirror for guiding subject images to the optical viewfinder; an image display device, serving as an electronic viewfinder, for displaying a subject image captured by an image-capturing device with the movable mirror retracted from the optical path; and a control device for starting image data acquisition with the image-capturing device after elapsing of a predetermined time, taking into consideration the amount of time necessary for the movable mirror to be retracted from the optical path and maximum diaphragm driving time of a diaphragm driving unit, following the user making a releasing operation while displaying a moving image on the image display device. This realizes a digital single-lens reflex camera which allows settings wherein the shutter release time lag is constantly the same, regardless of whether the optical viewfinder or the electronic viewfinder is used.

8 Claims, 4 Drawing Sheets

DIGITAL SINGLE-LENS REFLEX CAMERA

This application claims the benefit of Japanese Application No. 2004-125761 filed Apr. 21, 2004, the contents of which are incorporated by this reference.

BACKGROUND OF THE INVENTION

1. Field of the Invention

The present invention relates to a digital single-lens reflex camera, and in particular relates to a digital single-lens reflex camera having an electronic viewfinder which displays moving images, based on image data consecutively output from an image-capturing device, with a display device.

2. Description of the Related Art

Conventionally, still-image image-capturing devices (hereafter referred to as "digital camera"), which are configured so as to carry out image formation of a subject image formed, based on luminous flux entering a photographing optical system made up of multiple lens groups (hereafter referred to as "subject luminous flux"), on the photo-receiving plane of an image-capturing device or the like, such as a CCD (Charge Coupled Device) for example, disposed at a predetermined position, thereby acquiring a desired subject image, and to record the acquired subject image on a predetermined recording medium in a predetermined form such as digital data or the like, have been realized and are in widespread use.

Further, there are such digital cameras which have been realized as single-lens reflex cameras having a movable mirror or penta prism provided retractably as to the optical path of the photographing optical system, and also having an optical viewfinder for obtaining an optical observation image of the subject, and these are also beginning to become commonplace. Further, with such single-lens reflex cameras, lens interchangeable types have also been realized, wherein a lens barrel having a photographing optical system for example and a driving mechanism thereof and so forth within, is formed so as to be detachably mounted to the camera body, such that the user can optionally exchange the lens barrel as necessary.

The series of actions carried out for taking a picture with a conventional digital camera involve mechanical driving actions such as closing down the diaphragm blades of the diaphragm mechanism, being executed in the time period following the user operating the shutter release operation member up to the actual exposure operation with the image-capturing device of the like. That is to say, the exposure operation at the image-capturing device is started only after a predetermined amount of time has elapsed following operation of the shutter release operation member.

In this way, there is a time delay from the point in time that the shutter release operation is performed to the point in time at which the exposure to the image-capturing device starts at the time of performing photography with the digital camera, which is known as a shutter release time lag.

Particularly, in the case of single-lens reflex cameras, there is the need for the additional action of retracting the movable mirror disposed within the optical path of the photographing optical system to the outside of the optical path, in addition to the aforementioned diaphragm mechanism closing actions and so forth, following the shutter release operation. Consequently, there has been the tendency in single-lens reflex cameras for the shutter release time lag to be even longer.

Accordingly, with the current state of the field of conventional generally single-lens reflex cameras, photographers who demand precise shutter release timing deal with the shutter release time lag problem by performing the shutter release operation earlier than the desired timing so as to compensate for the shutter release time lag, which is a highly advanced photographing skill. In light of this, the shutter release time lag of the camera should be always constant.

Conventionally, various proposals have been made for means for suppressing irregularities in shutter release time lag occurring in the various types of cameras, so that the shutter release time lag is always constant, as disclosed in Japanese Unexamined Patent Application Publication No. 2002-199288 and Japanese Unexamined Patent Application Publication No. 6-75266.

The digital camera disclosed in Japanese Unexamined Patent Application Publication No. 2002-199288 has an EEPROM for storing a predetermined time which is equal to or greater than the maximum time necessary for starting driving of the diaphragm mechanism to ending of driving thereof, and effects control so as to execute exposure operations with the image-capturing device after waiting for the predetermined time stored in the EEPROM to elapse following the shutter release operation which instructs starting of the shooting operation.

Also, the single-lens reflex type camera disclosed in Japanese Unexamined Patent Application Publication No. 6-75266 executes the exposing action after waiting for a predetermined amount of time to elapse after a shutter release signal being generated, thereby suppressing changes in the shutter release time lag due to slight changes in the time for retracting the movable mirror, which are in turn due to irregularities in the movable mirror driving mechanism and to effects of the photographing environment.

Now, conventional digital cameras usually have a viewfinder for observing the subject to be photographed at the time of shooting a picture. There are two primary types of viewfinders conventionally used. One is an optical viewfinder made up of an observation optical system, having a configuration like those of conventional so-called film cameras which take pictures with conventional photographing film. The other is the so-called electronic viewfinder device which takes image data consecutively output from the image-capturing device or the like, and displaying a moving image based on the image data using a liquid crystal display device or the like.

On the other hand, conventional digital cameras usually have an image display device such as a liquid crystal display device or the like for reproducing and displaying image data taken by photographing. With a configuration wherein the image display device is used for displaying output data from the image-capturing device or the like, the image display device can be easily used as the aforementioned electronic viewfinder, and accordingly, digital cameras which use the image display device as an electronic viewfinder have been conventionally realized and commonly employed.

In fact, conventional digital cameras which have both an optical viewfinder device and an electronic viewfinder device, allowing the user to switch between the two according to the photographing environment for shooting a subject or according to the preferences of the user, have come into commonplace use.

SUMMARY OF THE INVENTION

The digital single-lens reflex camera according to the present invention comprises: an optical viewfinder device; a movable mirror retractably disposed in an optical path of a photographing optical system for guiding subject images to the optical viewfinder device; an image-capturing device for converting the subject images introduced via a taking lens into image signals, with the movable mirror in a state retracted from the photographing optical path; an image signal processing circuit for processing image signals from the image-capturing device and generating image data; a display device for displaying moving images using the image data output from the image signal processing circuit; and a microcomputer for, in the event that a release operation signal is input while a moving image is being displayed on the display device, performing recording control of the image data output from the image signal processing circuit, following a predetermined amount of time elapsing.

Advantages of the present invention will become more fully apparent from the following detailed description.

DESCRIPTION OF THE PREFERRED EMBODIMENTS

Figure 1:
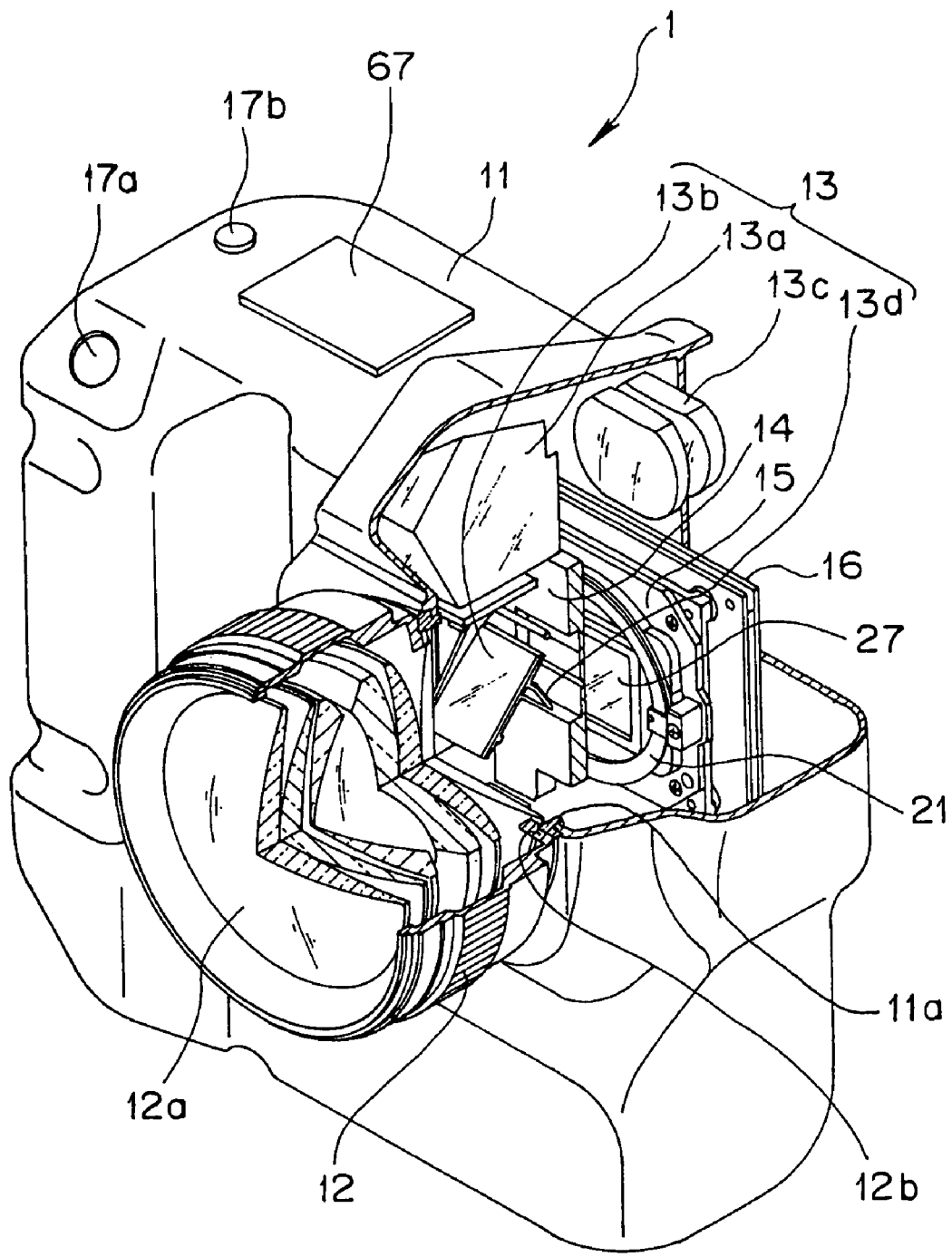
FIG. 1 is a partial cutaway perspective view of a digital single-lens reflex camera according to an embodiment of the present invention, schematically illustrating the inner configuration thereof.

A digital single-lens reflex camera 1 according to an embodiment of the present invention (hereafter referred to simply as "camera") comprises a camera body 11 and a taking lens barrel 12 (hereafter referred to simply as "lens barrel"), each configured separately one from another. The camera body 11 and the lens barrel 12 are configured such that the lens barrel 12 is detachably mountable to the camera body 11. That is to say, the camera 1 is a digital single-lens reflex camera with interchangeable lenses.

The lens barrel 12 has therein a photographing optical system 12a serving as a taking lens made up of multiple lens components and the like, a driving mechanism for the photographing optical system 12a (not shown in FIG. 1), and so forth. The photographing optical system 12a is configured of multiple optical lenses and the like, such that a luminous flux from a subject is transmitted, whereby a subject image constituted of the subject luminous flux is formed at a predetermined position (on the photoelectric conversion plane (photo-receiving plane) of a later-described image-capturing device 27; see FIG. 2). The lens barrel 12 is disposed so as to protrude frontward from the camera body 11.

The detailed configuration of the lens barrel 12 is similar to that generally employed with conventional cameras and the like, and accordingly description of the detailed configuration thereof will be omitted here.

The camera body 11 is configured having various component members and so forth within, thereby making up the principal main unit of the so-called interchangeable single-lens reflex digital camera, having on the front face thereof a lens barrel mounting unit 11a which is a linkage member for detachably mounting the lens barrel 12 holding the photographing optical system 12a. In other words, an exposure opening, having a predetermined diameter sufficient from introducing the subject luminous flux into the camera body 11, is formed at the substantially center portion of the front face of the camera body 11, with the lens barrel mounting unit 11a formed at the circumference edge portion of the exposure opening.

In addition to the above lens barrel mounting unit 11a formed on the front face of the camera body 11, the outer side of the camera body 11 has various operating members for operating the camera body 11 disposed thereupon on the top face, back face, and so forth, such as a release button 17a for generating instruction signals and the like for starting distance measuring operations (AF operations) and photometric operations (AE operations), exposure action, and so forth, a viewfinder switching operation member 17b for switching the viewfinder device used for shooting photographs, and so forth. In FIG. 1, all of the operating members other than the release button 17a have been omitted from the drawing, to keep the drawing simple.

Various component members are disposed within the camera body 11 as shown in FIG. 1 at their respective positions, such as, for example, an optical viewfinder device 13 making up an observation optical system for observing a desired subject image formed by the photographing optical system 12a, a shutter unit 14 having a shutter mechanism and the like for controlling time of the subject luminous flux being cast onto the photoelectric conversion plane of the image-capturing device 27, an image-capturing unit 15 including the shutter unit 14, comprising the image-capturing device 27 which is a photoelectric conversion device and serving as image-capturing means for acquiring image signals corresponding to the subject image formed based on the subject luminous flux transmitted through the photographing optical system 12a, a dust reduction filter 21 serving as a dust reduction member which is disposed at a predetermined position in front of the photoelectric conversion plane of the image-capturing device 27 for preventing dust and the like from adhering to the photoelectric conversion plane, and so forth, multiple circuit boards including a main circuit board 16 upon which are mounted various electric members making up electric circuits such as an image signal processing circuit 16a (see FIG. 2) for subjecting image signals obtained from the image-capturing device 27 to various types of image processing (FIG. 1 only illustrates the main circuit board 16), and so forth.

The optical viewfinder device 13 comprises a reflecting mirror 13b which bends the optical axis of the subject luminous flux transmitted through the photographing optical system 12a in a predetermined direction (toward the observation optical system), a penta prism 13a for taking the luminous flux emitted from the reflecting mirror 13b and forming an erect image, an ocular lens 13c making up a part of the observation optical system, for enlarging the image formed by the penta prism 13a and forming an image of an optimal shape for observation, a secondary mirror 13d for guiding a part of the subject luminous flux to an AF sensor unit 65 (simply "AF sensor" in FIG. 2) side, and so forth.

The reflecting mirror 13b is a movable mirror disposed so as to advance and retract between a predetermined position on the optical axis of the photographing optical system 12a, and a position retracted from the optical axis. This reflecting mirror 13b is disposed on the optical axis of the photographing optical system 12a with a predetermined angle as to the optical axis, 45° for example. Thus, the subject luminous flux which has been transmitted through the photographing optical system 12a is bent by the reflecting mirror 13b in the event that the camera 1 is in the normal state, and is reflected toward the penta prism 13a disposed above the reflecting mirror 13b.

Also, the secondary mirror 13d is disposed on the face of the reflecting mirror 13b facing the image-capturing device 27, so as to be rotatable with an angle of 90° as to the reflecting mirror 13b. Accordingly, a part of the luminous flux is capable of being transmitted at around the center portion of the reflecting mirror 13b.

Thus, in the event that the camera 1 is in the normal state, the luminous flux transmitted through part of the reflecting mirror 13b has the optical axis thereof bent so as to reflect toward the AF sensor unit 65 disposed below the secondary mirror 13d.

On the other hand, while the photographing actions of the present camera 1 are being executed, the reflecting mirror 13b is arranged so as to move to a predetermined position retracted from the optical axis of the photographing optical system 12a during the actual exposing action. Thus, the subject luminous flux is guided toward the image-capturing device 27, and is cast on the photoelectric conversion plane thereof. In this case, control for moving the reflecting mirror 13b between the predetermined position retreated from the optical axis of the photographing optical system 12a, and the predetermined position on the optical axis of the photographing optical system 12a, is performed by a mirror driving mechanism 63 (see FIG. 2).

As for the shutter unit 14, a commonly-used arrangement in conventional cameras and the like is applied, such as a focal plane shutter mechanism, a driving circuit for controlling the actions of the shutter mechanism, and so forth. Accordingly, detailed description of the configuration thereof will be omitted.

With the camera 1 according to the present embodiment, the lens barrel 12 having the photographing optical system 12a within as described above, the camera body 11 which is the main unit of the device, and so forth, make up a single system. In this case, the lens barrel 12 is detachably mounted to the camera body 11 via the lens barrel mounting unit 11a on the front face of the camera body 11. Accordingly, the back end of the lens barrel 12 has a mounting unit 12b which engages with the lens barrel mounting unit 11a, so that the camera body 11 and the lens barrel 12 have a so-called bayonet linkage.

Figure 2:
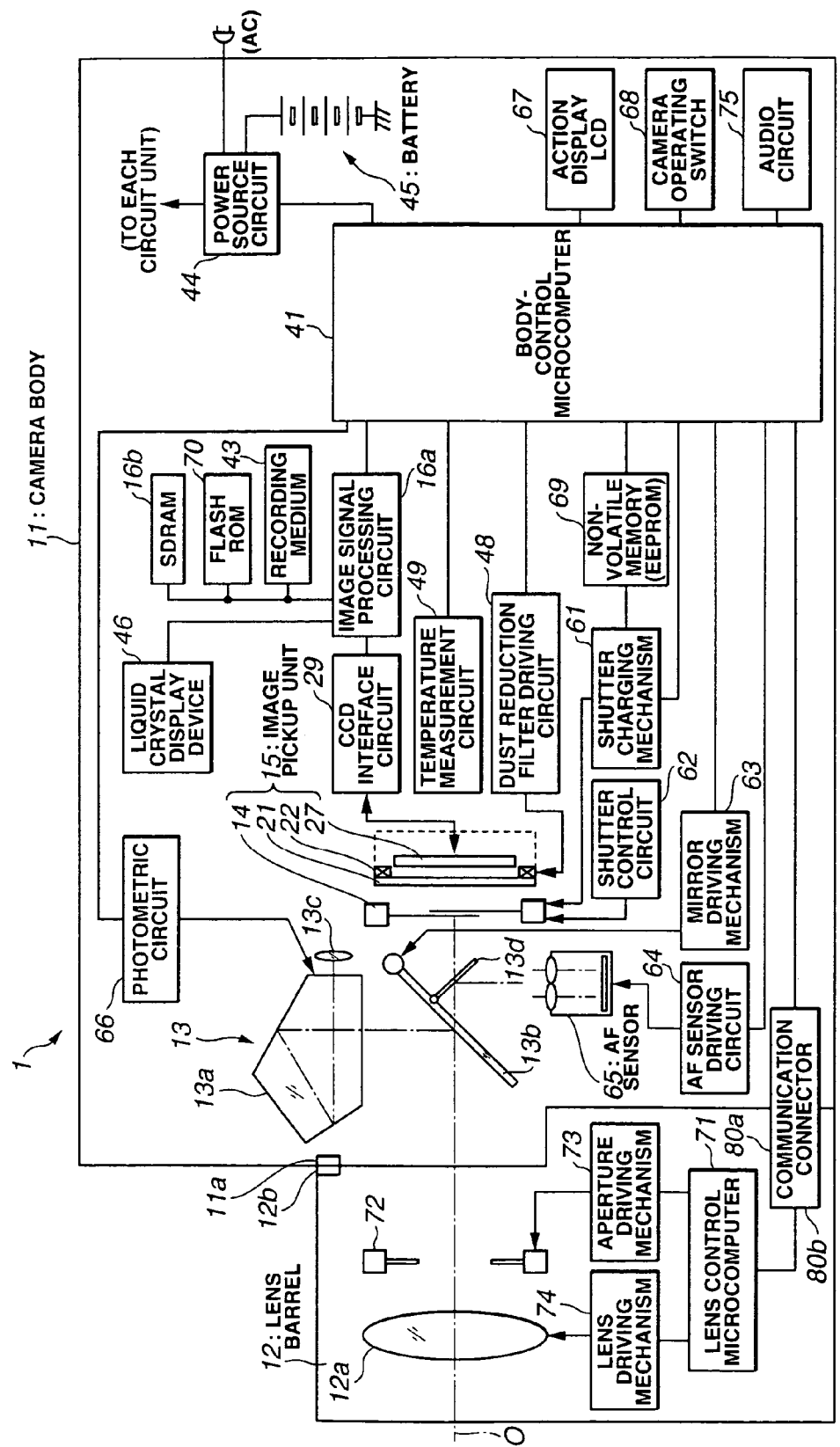
FIG. 2 is a block configuration diagram schematically illustrating mainly the electrical configuration of the digital single-lens reflex camera shown in FIG. 1.

As shown in FIG. 2, the camera body 11 and the lens barrel 12 have a body controlling microcomputer 41 for controlling the camera body 11, and a lens controlling microcomputer 71 for controlling the lens barrel 12, respectively. The body controlling microcomputer 41 and the lens controlling microcomputer 71 are electrically connected via communication connectors 80a and 80b in the state that the camera body 11 and the lens barrel 12 are connected, so as to be capable of mutual communication.

That is to say, the camera body 11 and the lens barrel 12 have the communication connectors 80a and 80b respectively, as shown in FIG. 2, and upon the camera body 11 and the lens barrel 12 being placed in a state wherein the lens barrel 12 is mounted to the camera body 11, the body controlling microcomputer 41 and the lens controlling microcomputer 71 are electrically connected via the communication connectors 80a and 80b, and are capable of mutual communication. At this time, the lens controlling microcomputer 71 works dependently under the control by the body controlling microcomputer 41 to cooperate therewith in a subjected manner, i.e., the body controlling microcomputer 41 serves as control means for controlling the camera 1 as a system entirely.

As shown in FIG. 2, the lens barrel 12 comprises the lens controlling microcomputer 71 for controlling the components of the lens barrel 12, the photographing optical system 12a comprising multiple lenses and the like, a lens driving mechanism 74 which is a driving mechanism for moving the photographing optical system 12a in a predetermined direction by an arbitrary amount at an arbitrary time, including a DC motor (not shown) and so forth, a diaphragm mechanism unit 72 for adjusting the amount of light of the luminous flux cast into the photographing optical system 12a, a diaphragm driving mechanism 73 including a stepping motor (not shown) and the like for driving the diaphragm mechanism unit 72, and so forth.

The lens controlling microcomputer 71 electrically controls driving of the lens driving mechanism 74, diaphragm driving mechanism 73, and so forth, based on commands from the body controlling microcomputer 41 connected via the communication connectors 80a and 80b.

On the other hand, within the camera body 11, in addition to mechanical component members such as the above-described optical viewfinder device 13 made up of the reflecting mirror 13b, penta prism 13a, ocular lens 13c and secondary mirror 13d and the like, as well as the focal plane shutter unit 14, the mirror driving mechanism 63 for controlling driving of the reflecting mirror 13b, and a shutter charging mechanism 62 made up of a mechanism for charging spring force for driving the first curtain and the second curtain of the shutter unit 14, multiple circuit boards are disposed, and thus various types of electric circuits are configured.

As shown in FIG. 2, the electric configuration of the camera body 11 is made up of: the body controlling microcomputer 41 for centrally controlling the entire camera 1 by controlling the components of the camera body 11 for example; the AF sensor unit 65 for measuring distance upon receiving reflected luminous flux from the secondary mirror 13d; an AF sensor driving circuit 64 for controlling driving of the AF sensor unit 65; a shutter control circuit 61 for controlling driving of actions of the shutter unit 14 such as shutter speed; a photometric circuit 66 for measuring light upon receiving a part of the luminous flux cast into the penta prism 13a; the image-capturing unit 15 made up of an image-capturing device 27 which is a photoelectric conversion device for performing photoelectric conversion upon receiving the subject luminous flux, the dust reduction filter 21 made up of a transparent glass member or the like to serve as an optical device provided in front of the image-capturing device 27, a piezoelectric device 22 serving as vibrating means for vibrating the dust reduction filter 21 at a predetermined frequency, and so forth; a dust reduction filter driving circuit 48 which is an electric circuit (driving circuit) for driving controlling of the piezoelectric device 22 according to control signal output from the body controlling microcomputer 41 for vibrating the dust reduction filter 21, serving as driving means made up of an oscillator and the like; a CCD interface circuit 29 for controlling driving of the image-capturing device 27 and handling signal processing of image signals acquired by the image-capturing device 27; an image signal processing circuit 16a for performing various types of signal processing based on the output from the CCD interface circuit 29 (i.e., image signals acquired by the image-capturing device 27); work memory 16b such as SDRAM and FlashROM 70 which serve as temporary storage memory for temporarily recording image signals, image data, and accessory information, processed by the image signal processing circuit 16a; a recording medium 43 for recording image data to be recorded according to a predetermined format which has been generated by the image signal processing circuit 16a in a predetermined region; a liquid crystal display device (LCD) 46 serving as a display unit for displaying images; non-volatile memory 69 formed of EEPROM or the like storing control parameters necessary for controlling the present camera 1, and so forth; an operation displaying LCD 67 for displaying the operating state of the camera 1; camera operating switches (SW) 68 which are a group of switches which operate synchronously with various operating members of the camera 1 to generate respective predetermined instruction signals; an audio circuit 75 which is an audio generating circuit serving as audio generating means including an audio generating unit such as a speaker for generating electronic sounds, such as imitation shutter sounds, warning sounds in case of an error, and so forth; a battery 45 which is a dry cell for example; a power supply circuit 44 which receives power from the battery 45 or an external electrical power source (AC) supplied by a predetermined connection cable (not shown), and controls conversion thereof into a voltage suitable for operating the camera 1, so as to supply power to the electric circuits; a temperature measurement circuit 49 for measuring the temperature around the image-capturing device 27; and so forth.

Note that the image-capturing device 27 is protected by the dust reduction filter 21 which is transparent at least at the center thereof. The piezoelectric device 22 for vibrating the dust reduction filter 21 is provided on the circumference edge portion of the dust reduction filter 21, on the side thereof facing the photo-receiving plane of the image-capturing device 27.

The piezoelectric device 22 adheres to one face of the dust reduction filter 21, at the perimeter rim thereof. The piezoelectric device 22 is configured so as to apply vibrations to the dust reduction filter 21 under control by the dust reduction filter driving circuit 48. This makes up a dust and foreign material removal mechanism whereby dust and the like adhering to the surface of the dust reduction filter 21 is removed by the dust reduction filter 21 vibrating.

Note that the image-capturing device 27 and the piezoelectric device 22 are integrally stored within a case member encompassed by a frame, of which one face is one face of the dust reduction filter 21 as indicated by the broken line in FIG. 2. This arrangement yields even more preferable dust reduction.

Also, in normal cases, temperature affects the elastic coefficient of the glass member (the dust reduction filter 21) or the like, which is one factor that changes the natural vibration frequency thereof. Accordingly, at the time of using the dust reduction filter 21 by vibrating, there is the need to measure the temperature, and take into consideration change in the natural vibration frequency under the current environment. Particularly, the image-capturing device 27 in the camera 1 tends to exhibit drastic increase in temperature when operating, so measuring change in temperature of the dust reduction filter 21 disposed near the image-capturing device 27 allows the natural vibration frequency at that time to be predicted.

Accordingly, the camera 1 comprises the temperature measurement circuit 49 including a sensor (not shown) for measuring the temperature around the image-capturing device 27. The sensor installation position at this time, i.e., the temperature measurement point, is set so as to be near the vibrating surface of the dust reduction filter 21, for example.

Also, the camera operating switches 68 make up a switch group which operate synchronously with operating buttons necessary for user operations to execute predetermined actions of the camera 1, such as a first release switch indicating starting of the photometric operation (AC operation) and distance measuring operation (AF operation) and a second release switch for instructing start of the exposure operation, a mode change switch for changing the operating mode of the camera 1, a power switch for instructing turning the main power on and off, a switch for vibrating the dust reduction filter 21 to perform the dust-and-the-like removal operation, a viewfinder switching switch for switching the viewfinder to be used for photographing operations.

On the other hand, the output from the AF sensor unit 65 is transmitted to the body controlling microcomputer 41 via the AF sensor driving circuit 64. Upon receiving this, the body controlling microcomputer 41 executes known distance measurement processing.

Also, the image signal processing circuit 16a controls the CCD interface circuit 29 according to commands from the body controlling microcomputer 41. Thus, the output signals (image signals) from the image-capturing device 27 are acquired, and temporarily stored in the work memory 16b or the like made up of SDRAM or the like.

The image signals temporarily recorded in the work memory (SDRAM) 16b are then subjected to predetermined signal processing at the image signal processing circuit 16a, thereby being converted into display image of an optimal shape for displaying an image, output to the liquid crystal display device 46, and accordingly a corresponding image is displayed using the display unit thereof (not shown).

Further, the image signals temporarily recorded in the work memory (SDRAM) 16b are then subjected to predetermined signal processing at the image signal processing circuit 16a, thereby being converted into recording image data of an optimal shape for recording, such as compressed data or the like such as the JPEG format or the like, output to the recording medium 43, and recorded thereon.

Note that while the liquid crystal display device 46 of the camera 1 according to the present embodiment serves as image reproducing means for reproducing image corresponding to image data recorded in the recording medium 43, the liquid crystal display device 46 also serves as an electronic viewfinder device which is image display means for displaying moving images based on image data, which are continuously output from the image-capturing device 27, during photographing actions. The image-capturing device 27 captures image data representing the subject image with the reflecting mirror 13b (movable mirror) retracted from the photographing optical path.

The mirror driving mechanism 63 is a mechanism for driving the reflecting mirror 13b between a position wherein the reflecting mirror 13b is retracted from the optical path of the photographing optical system 12a (UP position) and a predetermined position wherein the reflecting mirror 13b is positioned in the optical path of the photographing optical system 12a (DOWN position).

For example, in the event that the reflecting mirror 13b is in the DOWN position, the luminous flux from the photographing optical system 12a has the optical axis thereof bent by the reflecting mirror 13b and guided toward the penta prism 13a. Also, a part of the luminous flux from the photographing optical system 12a is transmitted through the reflecting mirror 13b and has the optical axis thereof bent by the secondary mirror 13d, and is guided toward the AF sensory unit 65.

The luminous flux from the photographing optical system 12a guided toward the penta prism 13a as described above forms a predetermined subject image at the penta prism 13a, and the user can observe this subject image by way of the ocular lens 13c. Also, part of the luminous flux transmitted through the penta prism 13a is guided to the photometric circuit 66. At the photometric circuit 66, predetermined photometry processing is performed by operations of an internal photo-sensor (not shown) and the like. The output signals indicating the photometry results are transferred to the body controlling microcomputer 41.

Also, a part of the luminous flux from the photographing optical system 12a that has been guided toward the AF sensor unit 65 is subjected to photoelectric conversion by operations of an internal AF sensor (not shown) of the AF sensor unit 65. The output from the AF sensor unit 65 is output to the AF sensor driving circuit 64, and transmitted to the body controlling microcomputer 41 via the AF sensor driving circuit 64. Upon receiving this, the body controlling microcomputer 41 performs predetermined distance measurement. The output signals indicating the measurement results are transferred to the body controlling microcomputer 41.

Further, the body controlling microcomputer 41 has connected thereto the audio circuit 75 including audio emission members such as a speaker and so forth. The audio circuit 75 receives predetermined control signals output from the body controlling microcomputer 41, and emits electronic sounds such as imitation shutter sounds, warning sounds, message sounds, and so forth, at predetermined timings.

Now, as described above, the camera 1 according to the present embodiment is an interchangeable digital single-lens reflex camera, and has the optical viewfinder device 13 and the liquid crystal display device 46 serving as an electronic viewfinder device, and the user can switch between using either of these two.

In this case, the optical viewfinder device 13 is configured of the reflecting mirror 13b, penta prism 13a, ocular lens 13c and so forth, and is used with the reflecting mirror 13b positioned at a predetermined position on the optical path of the photographing optical system 12a.

That is to say, in a state wherein the reflecting surface of the reflecting mirror 13b is positioned so as to face the photographing optical system 12a, and at a 45° angle with respect to the optical axis O of the photographing optical system 12a, the luminous flux incident through the photographing optical system 12a has the optical axis O thereof bent by 90° by the reflecting mirror 13b and is guided toward the penta prism 13a, and then the subject image formed by the penta prism 13a reaches the ocular lens 13c, where the user can observe the subject image.

On the other hand, in the event that the user operates the viewfinder switching operating member 17b which is one of the various types of operating members provided on the outer surface of the camera body 11, in this state, i.e., in the state that the optical viewfinder device 13 can be used, the liquid crystal display device 46 of the camera 1 becomes usable for observing the subject image, i.e., serves as an electronic viewfinder device.

In this case, upon operating the viewfinder switching operating member 17b described above (see FIG. 1), a viewfinder switching switch included in the camera operating switches 68 (see FIG. 2) is activated, and upon receiving the signal thereof the body controlling microcomputer 41 controls driving of the reflecting mirror 13b through the mirror driving mechanism 63, such that the reflecting mirror 13b is retracted to a predetermined position out of the optical path of the photographing optical system 12a. At the same time, the body controlling microcomputer 41 controls driving of the shutter unit 14 through the shutter control circuit 61, so as to leave the shutter unit 14 open. Subsequently, the body controlling microcomputer 41 performs control for driving the image-capturing device 27 and the liquid crystal display device 46, acquires moving image data of the subject image, and displays this on the liquid crystal display device 46, so the user can observe the subject image.

Now, description will be made regarding the operations at the time of executing the photographing actions with the camera 1 according to the present embodiment. First, description will be made regarding a case of using the optical viewfinder device 13 for photographing.

At the time of photographing with the camera 1 according to the present embodiment, first, the user operates an operating member (not shown in particular) for operating the power switch, among the various operating members provided on the outer surface of the camera body 11, whereby the power switch is turned on.

Upon the power switch being turned on, the body controlling microcomputer 41 performs predetermined initializing processing for the internal electrical circuits of the camera body 11. Thus, the camera 1 is in a shooting standby mode. At this time, we are assuming that the camera 1 is set to a photographing mode which enables photographing.

In this state, the user of the camera 1 first observes a desired subject with the optical viewfinder device 13, and performs a first stage operation of the release button 17a at an arbitrary timing. This operation generates an instruction signal from the first release switch 17a among the camera operating switches 68, instructing executing of AF operations including distance measuring operations, and photometric operations.

Upon receiving this, the body controlling microcomputer 41 executes distance measurement by driving the AF sensor unit 65 through the AF sensor driving circuit 64. Based on the results thereof, the body controlling microcomputer 41 controls the lens driving mechanism 74 by the lens controlling microcomputer 71 connected via the communication connectors 80a and 80b, thereby controlling driving of the photographing optical system 12a. Accordingly, the subject image formed by the photographing optical system 12a can be observed at the optical viewfinder device 13 in a focused state. This series of actions make up the AF operation.

At the same time as the above-describe AF operation, the body controlling microcomputer 41 executes photometric operations by controlling driving of the photometric circuit 66, and temporarily holds data acquired as the photometry results.

Upon the user of the camera 1 performing the second stage operation of the release button 17a in this state, the second release switch among the camera operating switches 68 generates an instruction signal instructing execution of the exposure actions.

Upon receiving this, the body controlling microcomputer 41 controls driving of the reflecting mirror 13b through the mirror driving mechanism 63, so that the reflecting mirror 31b is retracted to the predetermined position out of the optical path of the photographing optical system 12a. At the same time, the body controlling microcomputer 41 controls the lens controlling microcomputer 71 via the communication connectors 80a and 80b, so that driving of the diaphragm mechanism unit 72 is executed through the diaphragm driving mechanism 73 by the lens controlling microcomputer 71. Note that the diaphragm mechanism unit 72 is always in an opened state in the normal state of the camera. Accordingly, the driving control of the diaphragm mechanism unit 72 performed here is a stopping down action.

After the driving control of the reflecting mirror 13b and the diaphragm mechanism unit 72 is completed (the system stands by until completion thereof), the main exposure actions are executed. Specifically, the body controlling microcomputer 41 controls driving of the shutter unit 14 through the shutter control circuit 61, and at the same time, executes driving control of the image-capturing device 27. The image data of the subject image is acquired by the driving control of the shutter unit 14 and the image-capturing device 27. These actions make up the main exposure action.

Note that the driving control of the shutter unit 14 and the diaphragm mechanism unit 72 is performed based on the shutter speed and aperture settings determined by calculation based on the photometry results obtained in the above-described photometric operation, or shutter speed and aperture settings set by the user beforehand, or the like.

Also, there is the need to complete the retraction action of the reflecting mirror 13b and the driving action of the diaphragm mechanism unit 72 within the time necessary for the driving control of the shutter unit 14 and the image-capturing device 27, which is performed before the driving control of the shutter unit 14 and the image-capturing device 27 in the main exposure action, within the time from the second stage operation of the release button 17a (second release switch) being operated to the main exposure action being started.

Thus, there is the need for the retracting action of the reflecting mirror 13b and the driving control of the diaphragm mechanism unit 72 to be completed before driving the shutter unit 14 and the image-capturing device 27 to start the main exposure action. The amount of time necessary for these actions will be referred to "mirror retraction time".

Figure 3:
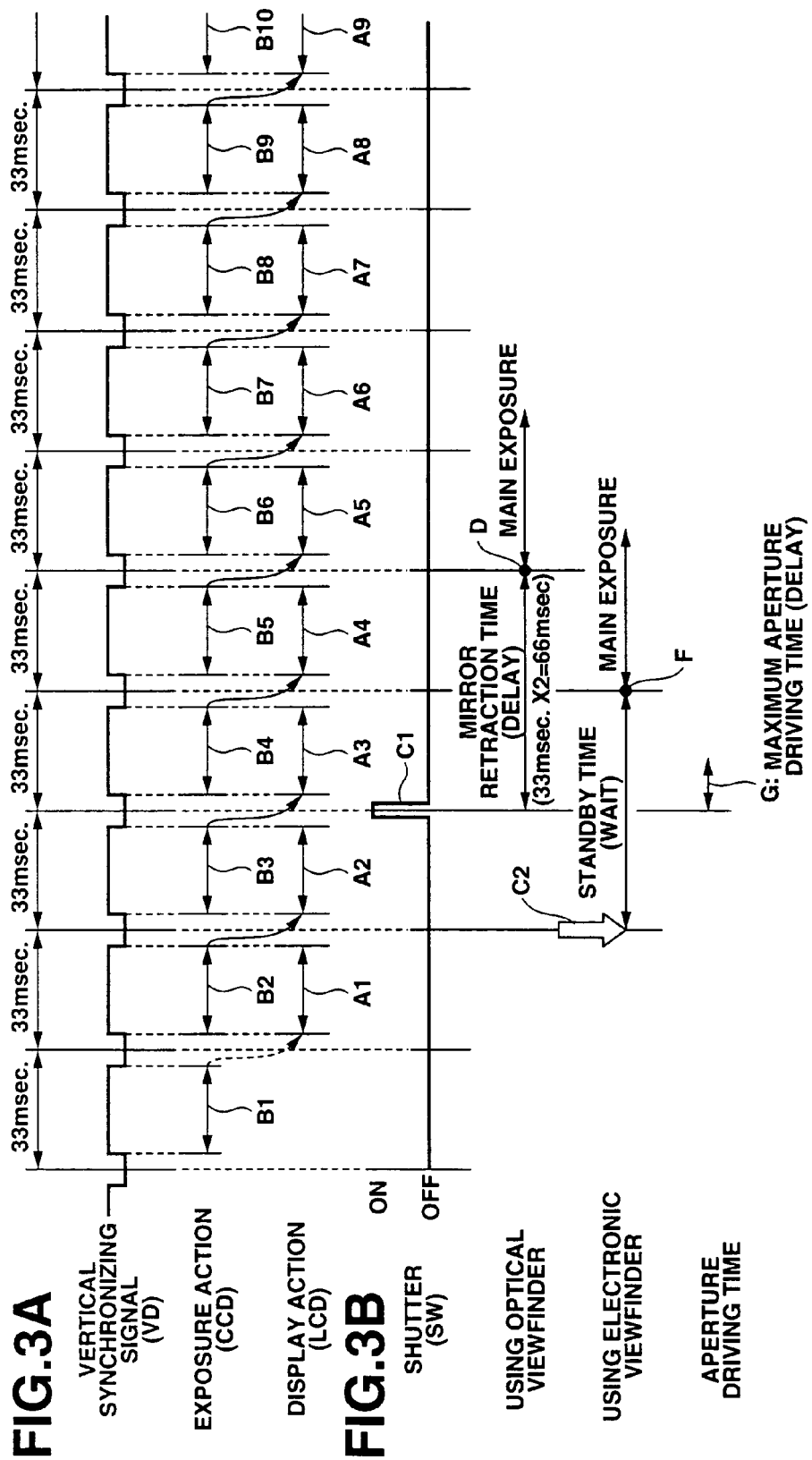
FIGS. 3A and 3B are timing charts for describing operations in the case of using a liquid crystal display device as an electronic viewfinder device with the digital single-lens reflex camera shown in FIG. 1.

Let us assume that the mirror retraction time for the digital single-lens reflex camera according to the present embodiment is approximately 66 msec (see FIG. 3B). Accordingly, the shutter release time lag in this case is approximately 66 msec.

That is to say, if the user performs the second stage operation of the release button 17a at the photographing timing denoted by C1 in FIG. 3B, the main exposure action starts at the point D which is approximately 66 msec from the point C1.

Once the main exposure action by the image-capturing device 27 is completed as described above, subsequently, the body controlling microcomputer 41 performs driving control of the shutter unit 14 through the shutter charging mechanism 62 to perform shutter charging operations for the next exposure action. At the same time, the body controlling microcomputer 41 drives the reflecting mirror 13b through the mirror driving mechanism 63, so that the reflecting mirror returns to its predetermined position on the optical path of the photographing optical system 12a. Further, the body controlling microcomputer 41 controls the lens controlling microcomputer 71 connected via the communication connectors 80a and 80b. The lens controlling microcomputer 71 controls driving of the diaphragm mechanism unit 72 through the diaphragm driving mechanism 73 so as to return to the original opened state. This series of actions is the exposure action. The camera 1 then goes to the standby state for the next photographing action.

Next, the operations for using the liquid crystal display device 46 as an electronic viewfinder for photographing will be described.

In the normal state of the camera 1 according to the present embodiment, the optical viewfinder device 13 is available for use at the point that the power switch is turned on as described above. The user then performs mode setting operations for using the liquid crystal display device 46 as an electronic viewfinder.

That is to say, upon the user operating the viewfinder switching operating member 17b for switching the viewfinder for shooting, of the various operating members provided on the outer surface of the camera body 11, a predetermined instruction signal is generated from a viewfinder switching switch included in the camera operating switches 68 (see FIG. 2).

Upon receiving this, the body controlling microcomputer 41 controls driving of the reflecting mirror 13b through the mirror driving mechanism 63, so that the reflecting mirror 31b is retracted to the predetermined position out of the optical path of the photographing optical system 12a. At the same time, the body controlling microcomputer 41 controls driving of the shutter unit 14 through the shutter control circuit 61, so as to leave the shutter unit 14 open.

Subsequently, the body controlling microcomputer 41 performs control for driving the image-capturing device 27 and the liquid crystal display device 46, and acquires moving image data of the subject image. The data is subjected to predetermined signal processing, is output to the liquid crystal display device 46, and a moving image including the subject image is continuously displayed. Accordingly, so the user can observe the subject image as a moving image.

In this state, the user of the camera 1 first observes the subject with the liquid crystal display device 46, and performs the first stage operation of the release button 17a at an arbitrary timing. This operation executes contrast AF and photometric operations using the image data acquired by the image-capturing device 27. Accordingly, the subject image formed by the photographing optical system 12a can be observed at the liquid crystal display device 46 in a focused state.

Now, the liquid crystal display device 46 displays an observation image of the subject image according to the actions shown in FIGS. 3A and 3B.

First, let us assume that the display rate (image-capturing cycle) for the image displayed on the liquid crystal display device 46 of the camera 1 according to the present embodiment is 30 frames per second. Accordingly, actions are carried out at 33 msec per frame.

The display frames are displayed on the liquid crystal display device 46 according to the generation timing of vertical synchronizing signals VD as shown in FIG. 3A. Also, the exposure actions of the image-capturing device 27 ("CCD 27" in the Figure) are represented by B1, B2, and so on through B10. The display actions of the liquid crystal display device 46 ("LCD 46" in the Figure) are represented by A1, A2, and so on through A10.

That is to say, the image data of frame B1 acquired by the image-capturing device 27 is displayed as a display image of frame A1 on the liquid crystal display device 46, one VD (33 msec) later. In other words, with the liquid crystal display device 46, the image data obtained by the exposure action is displayed 33 msec after the exposure action. Rephrased, there is a 33 msec delay from the exposure action to the display action, which is the display delay time.

As described above, following the subject image becoming observable in a focused state on the liquid crystal display device 46, the user performs the second stage operation of the release button 17a at an arbitrary timing. Accordingly, an instruction signal instructing execution of the exposure action is generated from the second release switch among the camera operating switches 68.

Upon receiving this, the body controlling microcomputer 41 controls the lens controlling microcomputer 71 via the communication connectors 80a and 80b, and executes driving control of the diaphragm mechanism unit 72 via the diaphragm driving mechanism 73 by the lens controlling microcomputer 71.

Next, the main exposure action is executed upon completion of the driving control of the diaphragm mechanism unit 72. That is to say, the body controlling microcomputer 41 executes driving control of the image-capturing device 27. The driving control of the image-capturing device 27 acquires the still image data of the subject image.

Note that the driving control of the image-capturing device 27 and the diaphragm mechanism unit 72 is performed based on the shutter speed and aperture settings determined by calculation based on the photometry results obtained in the above-described photometric operation, or shutter speed and aperture settings set by the user beforehand, or the like.

Also, there is the need to complete the driving action of the diaphragm mechanism unit 72 within the time necessary for the driving control of the diaphragm mechanism unit 72, which is performed before the driving control of the image-capturing device 27 in the main exposure action, within the time from the second stage operation of the release button 17a (second release switch) being operated to the main exposure action being started. The time necessary for this will be referred to as "diaphragm driving time".

Note that this diaphragm driving time differs from one lens barrel 12 to another mounted on the camera body 11. Accordingly, with the camera 1 according to the present embodiment, it is controlled so as to preset the diaphragm driving time of the mounted lens barrel 12. The diaphragm driving time to be set is the maximum diaphragm driving time for driving the diaphragm mechanism unit 72 of the lens barrel 12, i.e., the amount of time necessary for stopping down the diaphragm mechanism unit 72 from the opened state to the minimum aperture. With a general interchangeable lens, the maximum diaphragm driving time is around 10 msec or so. This value is unique to each interchangeable lens. Accordingly, information relating to the maximum diaphragm driving time is stored in a storage circuit (not illustrated in particular) serving as storage means, or the like, within the lens controlling microcomputer 71 included in each interchangeable lens.

Now, the processing sequence for determining the maximum diaphragm driving time of the diaphragm mechanism unit 72 of the lens barrel 12 mounted on the camera 1 will be described with reference to FIG. 4.

The processing sequence involves communication between the body controlling microcomputer 41 at the camera body 11 side and the lens barrel 12 (interchangeable lens), which activates the diaphragm mechanism unit 72, and based on the operation state of the diaphragm mechanism unit 72 at this time, the body controlling microcomputer 41 determines the maximum diaphragm driving time of the diaphragm mechanism unit 72.

First, the operator operates an operating member for operating the power switch (not shown in particular), among the operating members of the camera body 11, whereby the power switch is turned on. At this point, the body controlling microcomputer 41 performs predetermined initialization of the internal electric circuits of the camera body 11. The sequence processing shown in FIG. 4 is executed at the state of this initialization.

Figure 4:
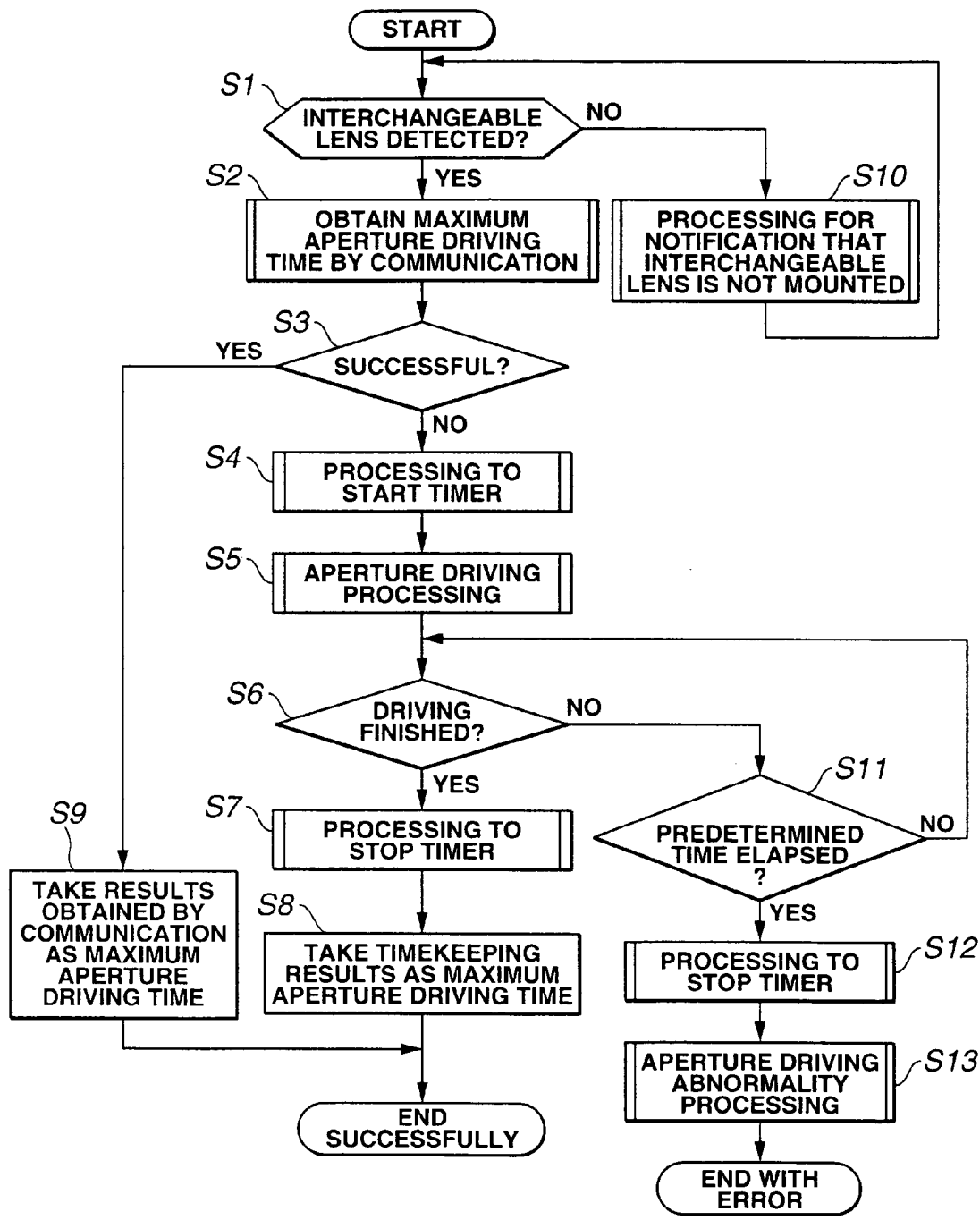
FIG. 4 is a flowchart illustrating the processing sequence at the time of setting maximum diaphragm driving time with the digital single-lens reflex camera shown in FIG. 1.

That is to say, in step S1 in FIG. 4, the body controlling microcomputer 41 detects whether or not a lens barrel 12 is mounted to the camera body 11 (interchangeable lens detection processing). This detection is determined by confirming whether or not the body controlling microcomputer 41 and the body controlling microcomputer 71 are electrically connected, by performing predetermined communication therebetween via the communication connectors 80a and 80b, for example.

Detecting means for detecting connection of the camera body 11 and the lens barrel 12 is not restricted to this arrangement, and an arrangement may be made wherein detecting means for mechanically detecting the bayonet linkage between the lens barrel mounting unit 11a of the body 11 and the mounting unit 12b at the back end of the lens barrel 12, so that the connection state thereof can be judged based on a signal from the detecting means.

Now, upon electric connection between the camera body 11 and the lens barrel 12 being confirmed, determination is made that the lens barrel 12 is mounted to the camera body 11, and the flow proceeds to the processing in the subsequent step S2.

Also, in the event that electric connection between the camera body 11 and the lens barrel 12 is not confirmed, the flow proceeds to step S10. In step S10, the body controlling microcomputer 41 uses the audio circuit 75 or the like to make notification that the lens barrel 12 is not mounted to the camera body 11, such as a warning display being made to that effect using the operation displaying LCD 67, or driving the audio circuit 75 to emit a predetermined warning sound or the like, thereby executing interchangeable lens not mounted notification processing. Subsequently, the flow returns to the processing in the above step S1.

On the other hand, in the above step S1, upon the connection of the camera body 11 and the lens barrel 12 being confirmed, and the flow proceeding to the subsequent step S2, the body controlling microcomputer 41 communicates with the lens controlling microcomputer 71 via the communication connectors 80a and 80b, and obtains information regarding the maximum diaphragm driving time unique to this lens barrel 12 that has been mounted. This information is stored in internal memory region of the lens controlling microcomputer 71 of the lens barrel 12 beforehand. Subsequently, the flow proceeds to the processing in step S3.

In step S3, the body controlling microcomputer 41 confirms whether or not obtaining the desired information has succeeded as a result of the above communication processing. Now, upon the body controlling microcomputer 41 determining that the desired information has been obtained, i.e., that obtaining of information relating to the maximum diaphragm driving time unique to this lens barrel 12 has been successful, the flow proceeds to the next step S9.

Next, in step S9, the body controlling microcomputer 41 performs settings for taking the obtained results as the maximum diaphragm driving time. Subsequently, the sequence is ended, and the camera 1 makes transition to the standby state (normal end).

On the other hand, in the event that determination is made in the above step S3 that obtaining of the desired information (information relating to the maximum diaphragm driving time) has failed, the flow proceeds to the following step S4. An example that can be conceived for failing to obtain information is a case wherein there is no desired information in the lens barrel 12 mounted thereto.

In step S4, the body controlling microcomputer 41 executes timer start processing for starting timing action with a timer (not shown) serving as timing means within itself, and the flow proceeds to the processing in step S5.

Next, in step S5, the body controlling microcomputer 41 communicates with the lens controlling microcomputer 71 via the communication connectors 80a and 80b. The lens controlling microcomputer 71 then executes control for driving the diaphragm mechanism unit 72 through the diaphragm driving mechanism 73, and executes predetermined diaphragm driving processing. Following this, the flow proceeds to step S6. Note that the diaphragm driving processing here is processing for driving the diaphragm mechanism unit 72 from the opened state down to the minimum aperture. This allows the operation of the diaphragm mechanism unit 72, and the maximum diaphragm driving time thereof, to be confirmed.

In step S6, the body controlling microcomputer 41 confirms whether or not the diaphragm driving processing executed in the above step S5 has been completed. Upon completion of the diaphragm driving processing being confirmed, the flow proceeds to the following step S7.

Next, in step S7, the body controlling microcomputer 41 executes timer stop processing for stopping timing action of the timer (not shown) within itself, and the flow proceeds to the processing in step S8.

In step S8, the body controlling microcomputer 41 performs settings for taking the time timed by the timer as the maximum diaphragm driving time. Subsequently, the sequence is ended, and the camera 1 makes transition to the standby state (normal end).

On the other hand, in the processing in the above step S6, in the event that confirmation of the diaphragm driving processing is not confirmed, the flow proceeds to the processing in step S11.

In step S11, the body controlling microcomputer 41 performs determination regarding whether a predetermined amount of time has elapsed, by confirming the timed time of the timer. Now, in the event that determination is made that a predetermined amount of time has not elapsed, the flow returns to step S6, and the same processing is repeated. Also, in the event that determination is made in step S11 that the predetermined amount of time has elapsed, the flow proceeds to the next step S12.

In step S12, the body controlling microcomputer 41 performs timer stopping processing for stopping the timing action of the timer. Subsequently, the flow proceeds to step S13.

In step S13, the body controlling microcomputer 41 executes diaphragm driving abnormality processing. Subsequently, the sequence is ended, and the camera 1 makes transition to the standby state (abnormal end).

Note that the diaphragm driving abnormality processing executed in step S13 above is processing for notifying the user that there is some sort of abnormal state in the diaphragm mechanism unit 72 of the lens barrel 12 mounted on the camera body 11. A specific example of the notification processing involves the body controlling microcomputer 41 using the audio circuit 75 to emit a predetermined warning sound or the like from an audio emission member such as a speaker or the like, or the body controlling microcomputer 41 controlling driving of the operation display LCD 67, so as to make a notification to that effect.

Thus, the maximum diaphragm driving time of the diaphragm mechanism unit 72 of the lens barrel 12 mounted on the camera 1 is set. Subsequently, the camera enters the photographing standby state.

Note that while the sequence processing shown in FIG. 4 as described above is described as being performed at the time of initialization of the camera body 11, the present embodiment is not restricted to this arrangement, arrangement may be made wherein the driving action of the diaphragm mechanism unit 72 is executed in response to the lens barrel 12 (interchangeable lens) being mounted to the camera body 11. In this case, a switch member may be provided for detecting mechanical linkage between the lens barrel mounting unit 11a of the body 11 and the mounting unit 12b of the lens barrel 12, thereby detecting the mounting state of the lens barrel 12 with the switch member.

Now, as described earlier, the camera 1 according to the present embodiment has an optical viewfinder device 13 and a liquid crystal display device 46 serving as an electronic viewfinder device as means for observing the subject image when photographing, with both being usable by switching therebetween as suitable.

The shutter release time lag at the time of using the optical viewfinder device 13 for photographing is around 66 msec, as described above. Accordingly, if the second stage operation of the release button 17a is made at the photographing timing C1 as indicated in FIG. 3B, the main exposure action starts at the point D, 66 msec after the point C1. In this case, processing is performed for obtaining data a predetermined amount of time later than the image data corresponding to the frame B6 shown in FIG. 3A.

On the other hand, in the event that the liquid crystal display device 46 is being used as the electronic viewfinder device, as there is no need to take the above mirror retraction time into consideration, if the second stage operation of the release button 17a is made at the photographing timing C1 as indicated in FIG. 3B, the main exposure action starts at the point C2, which is not the same as with the case of using the optical viewfinder device 13. That is to say, the image A2 displayed on the display unit of the liquid crystal display device 46 at the point C1 is an image corresponding to the frame B3 acquired earlier. This means that there is a delay in acquiring of the image data by the image-capturing device 27 and displaying the image corresponding thereto on the display unit of the liquid crystal display device 46 after processing being performed regarding the acquired image data. With the camera 1 according to the present embodiment, the delay time between the exposure to the display (hereafter referred to as "exposure-display delay time: DELAY") is one frame, as shown in FIG. 3B.

Accordingly, in the case of shooting while observing the display on the liquid crystal display device 46, the point one frame (33 msec) earlier than the operation timing of the release button 17a (C1), i.e., the point C2, is the time zero for the main exposure action.

Taking this into consideration, in this case, the point C2 in FIG. 3B can be taken as time zero, from which the camera 1 waits for 66 msec which is the same as the mirror retraction time, and the main exposure action is started at the timing F in FIG. 3B, which allows the shutter release time lag to be approximately the same for both cases of using the liquid crystal display device 46 and using the optical viewfinder device 13 as an electronic viewfinder device.

In other words, at the time of using the liquid crystal display device 46 as the electronic viewfinder device, starting the main exposure action after waiting 33 msec from the second stage operation of the release button 17a enables the main exposure action starting with generally same time lag at all times. The reason for waiting 33 msec is that this figure is obtained by subtracting the exposure-display delay time (33 msec) from the mirror retraction time (66 msec) when using he optical viewfinder device 13, i.e., 66 minus 33 equals 33 msec.

An arrangement may be made wherein, during the standby (WAIT) time in the case of using the liquid crystal display device 46 as the electronic viewfinder device, the body controlling microcomputer 41 controls the audio circuit 75 to emit an imitation mirror-up sound from a sound emission member such as a speaker or the like, i.e., to electronically generate a mirror-up sound or the like.

Also, the above description did not take into consideration the maximum diaphragm driving time G; this will be described next.

In the case of using the optical viewfinder device 13, the main exposure action is carried out following completion of the retraction action of the reflecting mirror 13b and the driving operation of the diaphragm mechanism unit 72. In this case, the retraction action of the reflecting mirror 13b and the driving operation of the diaphragm mechanism unit 72 is carried out generally at the same time. Normally, the maximum diaphragm driving time of the diaphragm mechanism unit 72 (around 10 msec) is sufficiently shorter than the retraction time of the reflecting mirror 13b (around 66 msec).

However, taking into consideration the possibility that there may be cases wherein the maximum diaphragm driving time of the diaphragm mechanism unit 72 is longer than the retraction time of the reflecting mirror 13b, an arrangement may be made wherein the longer of the two is taken as the reference time of the shutter release time lag.

Accordingly, with the camera 1 according to the present embodiment, the 66 msec which is the mirror retraction time set in the above description should be taken as the reference time for the shutter release time lag.

On the other hand, in the case of using the liquid crystal display device 46 as the electronic viewfinder device, if the second stage operation of the release button 17a is made at the photographing timing C1 as indicated in FIG. 3B, the main exposure action is executed after waiting an amount of time equal to the maximum diaphragm driving time, but there is the standby time (66 msec) from the point C2, taking into consideration the shutter release time lag. With the present embodiment, the maximum diaphragm driving time is 10 msec, which means that the driving action of the diaphragm mechanism unit 72 will be completed by the time that the standby time (66 msec) is up. Accordingly, in the case of the camera 1 according to the present embodiment, the 66 msec which is the mirror retraction time set in the above description should be taken as the reference time of the shutter release time lag.

In other words, comparison is made between the figure obtained by subtracting the exposure-display delay time (33 msec) from the mirror retraction time (66 msec) when using the optical viewfinder device 13, i.e., 66 minus 33 equals 33 msec, and the maximum diaphragm driving time (10 msec), and thus the longer time is taken as the standby time.

As described above, according to the present embodiment, with an interchangeable digital single-lens reflex camera configured so as to switch between using an optical viewfinder device and an electronic viewfinder device, in the event of using the liquid crystal display device 46 as the electronic viewfinder device, the main exposure action start timing is set taking into consideration the shutter release time lag occurring due to the mirror retraction time in cases of photographing using the optical viewfinder device 13, so the main exposure action is executed with generally same shutter release time lag at all times regardless of which viewfinder device is being used. Consequently, the user can use either viewfinder device in a natural manner, and constantly obtain intended photography results.

Thus, according to the present invention, with a digital single-lens reflex camera having both an optical viewfinder device and electronic viewfinder device, configured so as to switch between using the two, a digital single-lens reflex camera realizing a constant shutter release time lag regardless which viewfinder device is used for shooting can be provided.

It is clearly understood that a wide range of various embodiments of the present invention can be made based thereupon without departing from the spirit and scope of the present invention. The present invention should not be interpreted restrictively by any embodiment, except as defined in the appended claims.

What is claimed is:

1. A digital single-lens reflex camera comprising:
an optical viewfinder device capable of optically observing subject images;
a movable mirror retractably disposed in an optical path of a photographing optical system for guiding subject images to the optical viewfinder device;
an electronic viewfinder device capable of electronically observing the subject images with the movable mirror in a state retracted from the photographing optical path, the electronic viewfinder device including:
(i) an image-capturing device for converting the subject images into image signals;
(ii) an image signal processing circuit for processing image signals from the image-capturing device and generating image data; and
(iii) a display device for displaying moving images using the image data output from the image signal processing circuit;
a switching operation mechanism for switching between an observation state by the optical viewfinder device and an observation state by the electronic viewfinder device; and
a microcomputer for, in the event that a release operation signal is input while the electronic viewfinder device is selected, performing recording control of the image data output from the image signal processing circuit, following a predetermined amount of time elapsing,
wherein the predetermined amount of time is obtained by subtracting the image-capturing cycle from the amount of time necessary for the movable mirror to be retracted from the photographing optical path.

2. A digital single-lens reflex camera according to claim 1, further comprising an audio device for emitting an electronic sound within a predetermined time taking into consideration the amount of time necessary for the movable mirror to be retracted from the photographing optical path.

3. A digital single-lens reflex camera according to claim 2, wherein the electronic sound is an electronic mirror-up sound.

4. A digital single-lens reflex camera comprising:
an optical viewfinder device capable of optically observing subject images;
a movable mirror retractably disposed in an optical path of a photographing optical system for guiding subject images to the optical viewfinder device;
an electronic viewfinder device capable of electronically observing the subject images with the movable mirror in a state retracted from the photographing optical path, the electronic viewfinder device including:
(i) an image-capturing device for converting the subject images into image signals;
(ii) an image signal processing circuit for processing image signals from the image-capturing device and generating image data; and
(iii) a display device for displaying moving images using the image data output from the image signal processing circuit;
a switching operation mechanism for switching between an observation state by the optical viewfinder device and an observation state by the electronic viewfinder device; and
a microcomputer for, in the event that a release operation signal is input while the electronic viewfinder device is selected, performing recording control of the image data output from the image signal processing circuit, following a predetermined amount of time elapsing, wherein the predetermined amount of time is determined taking into consideration the amount of time necessary for the movable mirror to be retracted from the photographing optical path, and the maximum diaphragm driving time of a diaphragm mechanism, and wherein the predetermined amount of time is the longer of an amount of time obtained by subtracting the photographing cycle from the movable mirror retracting time, and the maximum diaphragm driving time of the diaphragm mechanism.

5. A digital single-lens reflex camera comprising:

an interchangeable taking lens;

an optical viewfinder device;

a movable mirror retractably disposed in an optical path of a photographing optical system for guiding subject images to the optical viewfinder device;

an image-capturing device for converting the subject images introduced via the taking lens into image signals, with the movable mirror in a state retracted from the photographing optical path;

an image signal processing circuit for processing image signals from the image-capturing device and generating image data;

a display device for displaying moving images using the image data output from the image signal processing circuit;

a diaphragm mechanism which is disposed within the taking lens and is electrically controlled; and a microcomputer for obtaining information relating to maximum driving time of the diaphragm mechanism from the interchangeable lens, and determining the timing of an exposure action with the image-capturing device, based on the information relating to maximum driving time of the diaphragm mechanism, and the amount of time necessary for the movable mirror to be retracted from the photographing optical path, wherein, in the event that the microcomputer cannot correctly obtain information relating to the maximum diaphragm driving time from the taking lens, the microcomputer causes the diaphragm mechanism to operate by communication carried out with the taking lens, and determines the maximum diaphragm driving time from the operating state of the diaphragm mechanism.

6. A digital single-lens reflex camera according to claim 5, wherein, in the event that the maximum driving time of the diaphragm mechanism is equal to or exceeds a predetermined amount of time, the microcomputer determines the diaphragm mechanism to be abnormal.

7. A digital single-lens reflex camera comprising:

an optical viewfinder device;

a movable mirror retractably disposed in an optical path of a photographing optical system for guiding subject images to the optical viewfinder device;

an image-capturing device for converting the subject images introduced via a taking lens into image signals, with the movable mirror in a state retracted from the photographing optical path;

an image signal processing circuit for processing image signals from the image-capturing device and generating image data;

a display device for displaying moving images using the image data output from the image signal processing circuit; and a microcomputer for, in the event that a release operation signal is input while a moving image is being displayed on the display device, performing recording control of the image data output from the image signal processing circuit, following a predetermined amount of time elapsing, wherein the predetermined amount of time is obtained by subtracting the image-capturing cycle from the amount of time necessary for the movable mirror to be retracted from the photographing optical path.

8. A digital single-lens reflex camera comprising:

an optical viewfinder device;

a movable mirror retractably disposed in an optical path of a photographing optical system for guiding subject images to the optical viewfinder device;

an image capturing device for converting the subject images introduced via a taking lens into image signals, with the movable mirror in a state retracted from the photographing optical path;

an image signal processing circuit for processing image signals from the image-capturing device and generating image data;

a display device for displaying moving images using the image data output from the image signal processing circuit; and a microcomputer for, in the event that a release operation signal is input while a moving image is being displayed on the display device, performing recording control of the image data output from the image signal processing circuit, following a predetermined amount of time elapsing, wherein the predetermined amount of time is determined taking into consideration the amount of time necessary for the movable mirror to be retracted from the photographing optical path, and the maximum diaphragm driving time of a diaphragm mechanism, and wherein the predetermined amount of time is the longer of an amount of time obtained by subtracting the photographing cycle from the movable mirror retracting time, and the maximum diaphragm driving time of the diaphragm mechanism.

* * * * *